United States Patent [19]

Veenstra

[11] Patent Number: 5,065,622
[45] Date of Patent: Nov. 19, 1991

[54] WIND DIRECTION INDICATOR

[76] Inventor: Steven E. Veenstra, 6092 Campus Park, Kentwood, Mich. 49508

[21] Appl. No.: 575,939

[22] Filed: Aug. 31, 1990

[51] Int. Cl.$^5$ ............................................. G01W 1/00
[52] U.S. Cl. ........................................ 73/188; 116/264
[58] Field of Search ................... 116/264, 265; 73/188

[56] References Cited

U.S. PATENT DOCUMENTS

| | | | |
|---|---|---|---|
| 174,866 | 3/1876 | Smith | 73/188 |
| 1,196,348 | 8/1916 | Gianini | 73/188 X |
| 1,213,714 | 1/1917 | Washburne et al. | 73/188 |
| 3,354,715 | 11/1967 | Cansey | 73/188 |
| 3,789,793 | 2/1974 | Keim | 73/188 |
| 3,791,211 | 2/1974 | Dobesch | 73/188 |
| 4,665,744 | 5/1987 | Smith | 73/188 X |
| 4,850,798 | 7/1989 | Bailey | 416/11 X |

Primary Examiner—Daniel M. Yasich
Attorney, Agent, or Firm—Waters & Morse

[57] ABSTRACT

This wind-direction indicator includes a pointing beam having a tail at one end formed by diverging feather segments, with a transverse hole in the central portion of the beam receiving a standard straight pin. A glass bead is interposed between the head of the pin and the underside of the beam, the upper extremity of the pin being attached to a standard alligator clip for attachment to a convenient twig. The hole receiving the pin is sufficiently larger than the pin to permit considerable rocking movement about a horizontal axis, and the beam is balanced after the assembly of the feathers by clipping the upwind end of the beam. This end is later finished by a short dip in a fluorescent paint, the rest of the device being finished either balck or with a camouflage pattern.

4 Claims, 2 Drawing Sheets

WIND DIRECTION INDICATOR

BACKGROUND OF THE INVENTION

Hunters after deer, bear, and other large animals have to select their positions carefully with respect to wind direction. The animals have an acute sense of smell, and any whiff of human scent will alert them to the danger. Usually, the hunter will select a position of concealment with a good view of a known trail, and which is downwind at the moment from where he expects the animals to appear. When there is a brisk breeze, this usually presents no problem. In calm air, however, imperceptible changes in local air movement can carry the telltale scent with them. A sudden reversal in such air movement can make it necessary to change position quickly.

When air is moving at only one or two feet per second, it becomes very difficult to detect its direction accurately. Sophisticated draft-detection instruments are expensive and cumbersome. Smoke from a cigarette is itself a giveaway. The present invention provides a very inexpensive and remarkably sensitive detector for the direction of air movement.

SUMMARY OF THE INVENTION

This wind-direction indicator has a balanced pointing beam pivoted on a vertical axis on a standard straight pin, with a bearing bead interposed between the head of the pin and the beam. The upper end of the pin is secured to a clip that can be attached easily to a convenient twig close to the hunter. The beam is a light piece of tubing oriented into the wind by a tail formed by diverging feathers having the ends of their quills pushed into the tubular end of the beam, and secured there by adhesive, and possibly also by crimping. The beam is balanced by trimming the up-wind end after the feathers are installed.

DESCRIPTION OF THE PREFERRED EMBODIMENT

Figure 5:
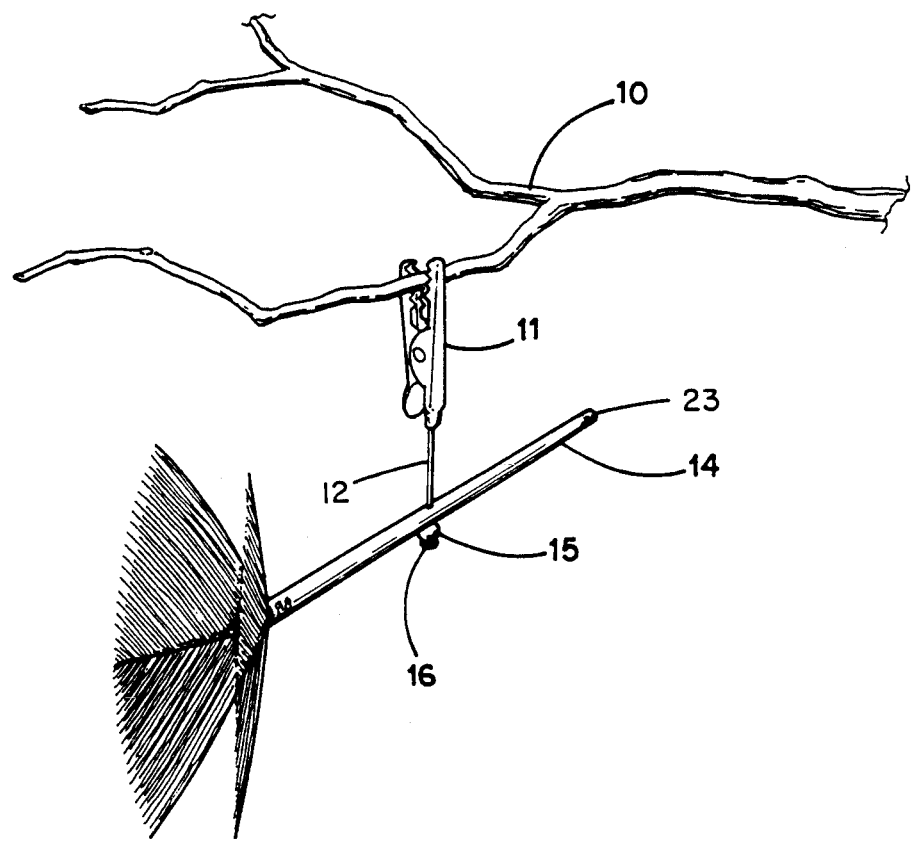
FIG. 5 is a perspective view of the device, shown attached to a twig.

Referring to the drawings, the wind direction indicator is shown clipped to a branch 10 (See FIG. 5), the clip 11 being a standard "alligator" clip familiar in electrical devices. The standard straight pin 12 is secured to the clip 11 in place of the usual wire connection. The pin 12 is preferably a number 16, with a diameter of approximately 0.022 inches. The pin traverses a hole 13 in the pointing beam 14. The hole is preferably formed by a drill in the range between number 65 (0.035 inches) and number 70 (0.0280 inches), which includes a fractional drill 1/32 inches in diameter. The fit of the pin in the hole should not be tight enough to produce any binding action whatever, and should permit considerable freedom of the pointing beam to rock about a horizontal axis. It is common knowledge that local air movement often has a vertical component, and it is desirable that the pointing beam should align itself with the air flow in order to eliminate any binding action of the beam on the pin, and to allow for some inaccuracy in the installation of the clip 11 on the twig 10. A flat glass bead 15 surrounds the pin 12, and is interposed between the beam 14 and the head of the pin 16.

Figure 1:
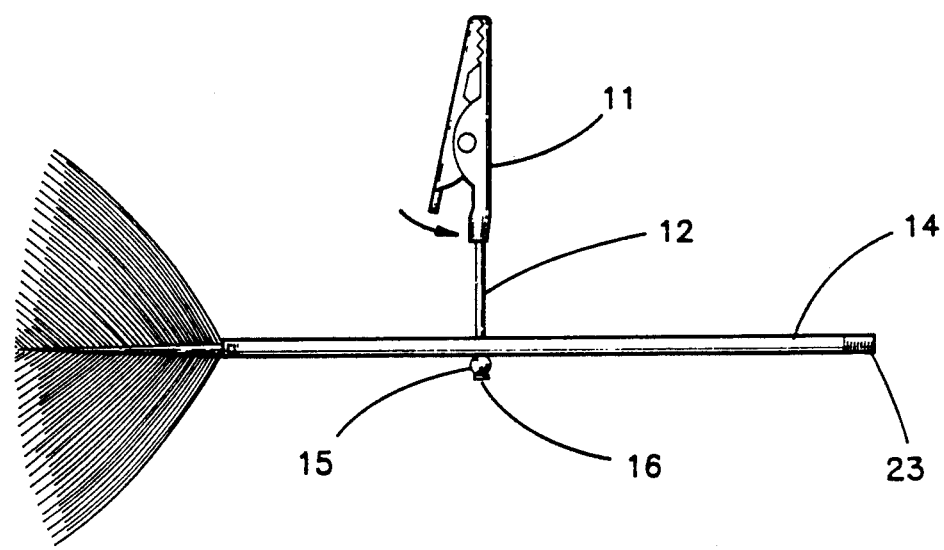
FIG. 1 is a side elevation of the completed device.
Figure 2:
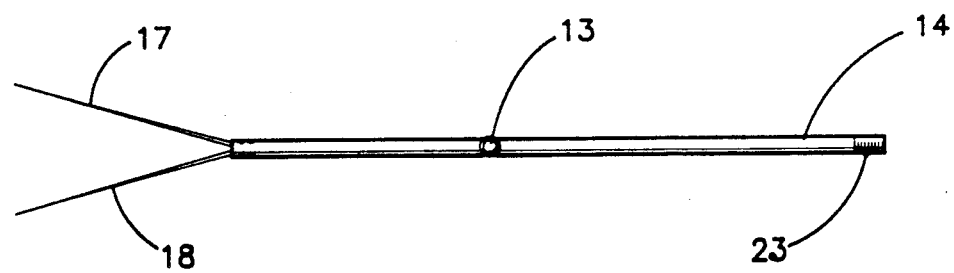
FIG. 2 is a top view of the pointing beam, with the feathers installed.
Figure 3:
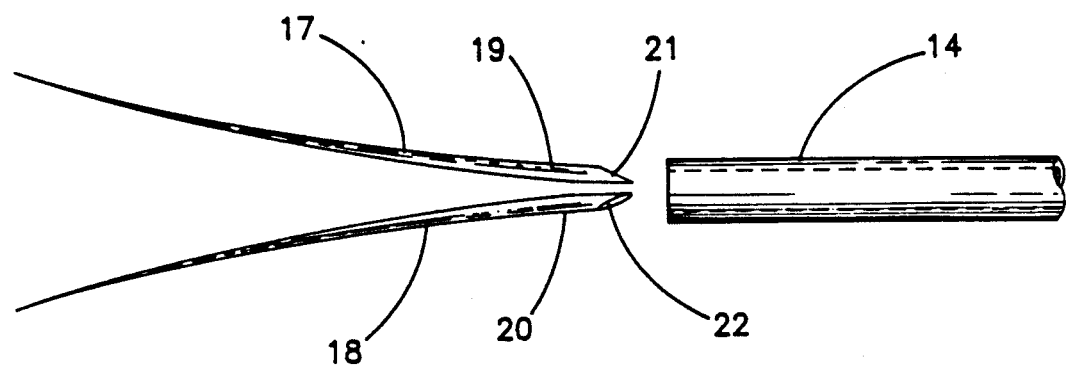
FIG. 3 is a view on an enlarged scale over FIG. 2, showing the trimming of the quills of the feathers, and the position of installation.

The tail, or fin, of the device responsible for orienting the pointing beam into the wind is provided by the pair of feather segments 17 and 18. The beam 14 is preferably a plastic (polypropylene) tube approximately 0.085 of an inch in outside diameter, and 0.040 inside diameter. The quill sections 19 and 20 are trimmed free of the laterally-extending feather structure for insertion into the open end of the tube 14. Before insertion, they are trimmed as shown at 21 and 22 in FIG. 3, in a direction that forces the quill sections together as they are inserted into the end of the tube. Their retention in the tube can be increased by the use of an adhesive, and possibly also by crimping the tube after insertion. It should be noted that the natural curvature of the feathers shown on FIG. 3 ±s oriented to produce an increasing divergence, proceeding away downwind from the end of the beam 14. This has a significant aerodynamic effect, as the curvature tends to produce a sensitive balance of wind forces that makes the device very responsive to the changes in the angle of attack of the feather segments, since both of the segments are producing lateral force at the same time, with the balance of these forces producing the orientation of the pointing beam. The angle of divergence appears to be best when selected at between twenty and forty-five degrees. FIG. 2 shows a constant divergence angle, which works, but is less effective. The best feathers appear to be from the plumage of turkeys.

In the manufacture of the device, the hole 13 is drilled in the beam 14 in a position that anticipates some degree of excess of weight on the up-wind side of the beam after the tail feathers are installed. The device is then balanced by mounting it on a pivot passing through the hole 13, and trimming the right end of the device (as shown in FIG. 2) until a good balance is achieved. A short dip (about 1/16 of an inch long) of fluorescent paint at the tip 23 is made at some point in the manufacture, and this dip should be made rather quickly to avoid a tendency for the paint to draw up into the tube and accumulate more weight than desired. In the balance trimming of the beam 14, allowance can be made for the estimated effect of the later accumulation of paint at the tip 23.

Figure 4:
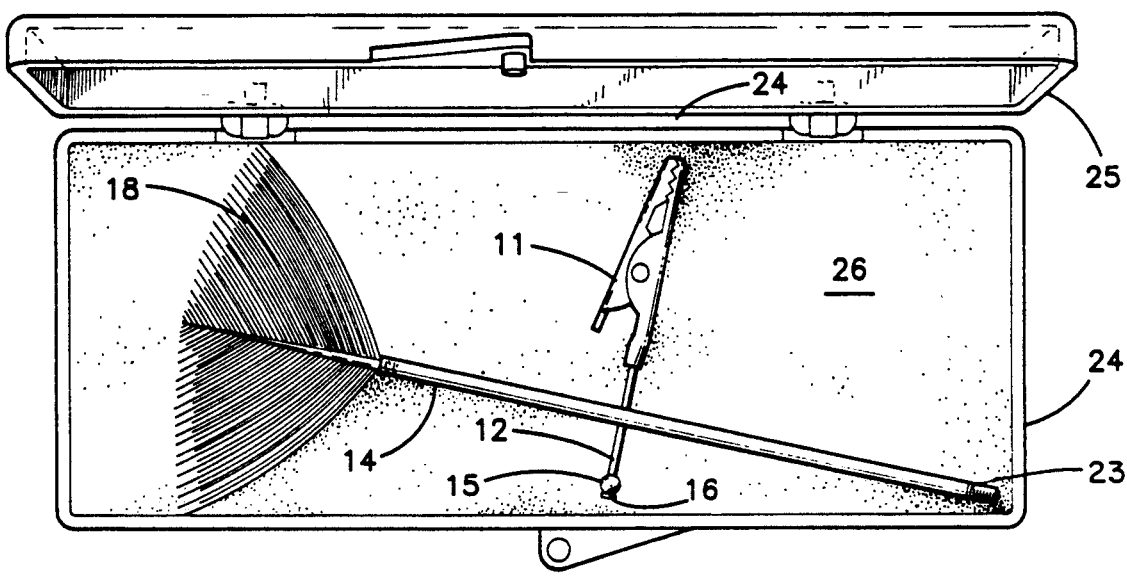
FIG. 4 is a view of the packaged condition of the device.

Preferably, the feathers 17 and 18 are painted black, along with the clip 11. The beam 14 is preferably finished with some well-recognized camouflage pattern, which usually includes shades of black and grey. The packaging of the device for marketing is shown in FIG. 4. A preferably transparent case 24 with a hinged cover 25 has a sufficient depth to receive the device, and preferably includes a soft foam padding 26 to gently confine the components so that the case can be carried conveniently in the hunter's pocket without risk of damage. It should be noted that the placement of the device within the case should require slipping the beam 14 along the pin toward the clip 11, so that the beam 14 assumes a somewhat diagonal position within the case to conserve space.

I claim:

1. A wind direction indicator including a pointing beam, journal-bearing means rotatably supporting said beam for movement about a normally vertical axis, and fin means secured to said beam and adapted to orient said beam to point into a draft of air, wherein the improvement comprises:
  a pair of feather elements constituting said fin means, said elements having quill portions secured to said beam to dispose said elements in downwind-diverging relationship; and
  said beam having a central transverse hole constituting said bearing means, and including pin means having a head supporting said beam, said pin means traversing said hole and constituting said journal means.

2. An indicator as defined in claim 1, additionally including a bead interposed between said head and said beam on said pin means.

3. An indicator as defined in claim 2, wherein said beam is balanced about a horizontal axis on said bead, said hole providing clearance around said pin permitting limited rocking movement.

4. An indicator as defined in claim 3, additionally including clip means secured to the normally upper end of said pin means.

* * * * *